United States Patent [19]

Numerick

[11] Patent Number: 4,794,725
[45] Date of Patent: Jan. 3, 1989

[54] INSECT TRAP

[76] Inventor: Allen Numerick, 5261 Harvard, Detroit, Mich. 48224

[21] Appl. No.: 172,756

[22] Filed: Mar. 28, 1988

[51] Int. Cl.$^4$ .............................................. A01M 5/08
[52] U.S. Cl. ...................................................... 43/139
[58] Field of Search ............................................ 43/139

[56] References Cited

U.S. PATENT DOCUMENTS

| | | | |
|---|---|---|---|
| 2,806,321 | 9/1957 | Blackman | 43/139 |
| 2,829,384 | 4/1958 | Studler | 43/139 |
| 2,893,161 | 7/1959 | Reid | 43/139 |
| 3,214,861 | 11/1965 | Arther | 43/139 |
| 4,074,458 | 2/1978 | Catlett | 43/139 |
| 4,175,352 | 11/1979 | Catlett | 43/139 |
| 4,279,095 | 7/1981 | Aasen | 43/139 |
| 4,282,673 | 8/1981 | Focks et al. | 43/113 |
| 4,449,319 | 5/1984 | Garcia | 43/139 |
| 4,485,583 | 12/1984 | Planty | 43/139 |
| 4,607,451 | 8/1986 | Jarecki | 43/189 |

Primary Examiner—Gene P. Crosby
Attorney, Agent, or Firm—Basile Hanlon

[57] ABSTRACT

An electrical motorized fan creates an airstream in a hollow housing to draw insects past a pivotal closure member at one end of the housing into a trap receptacle removably mounted within the housing. The fan is driven by an electric motor powered by a battery mounted within the housing. An electrical switch selectively connects the battery to the motor to energize the fan. The switch is coupled to the pivotal closure member such that movement of the switch between "off" and "on" positions simultaneously causes movement of the closure member between a first position closing the first end of the housing to air flow to a second position opening the first end of the housing to air flow. A mesh screen is mounted within the trap receptacle to trap insects drawn into the receptacle through the first end of the housing. An insecticide dispenser is slidably mounted on the trap receptacle and is selectively alignable with an aperture in the trap receptacle to allow the insecticide to permeate the trap receptacle and kill insects trapped therein.

10 Claims, 2 Drawing Sheets

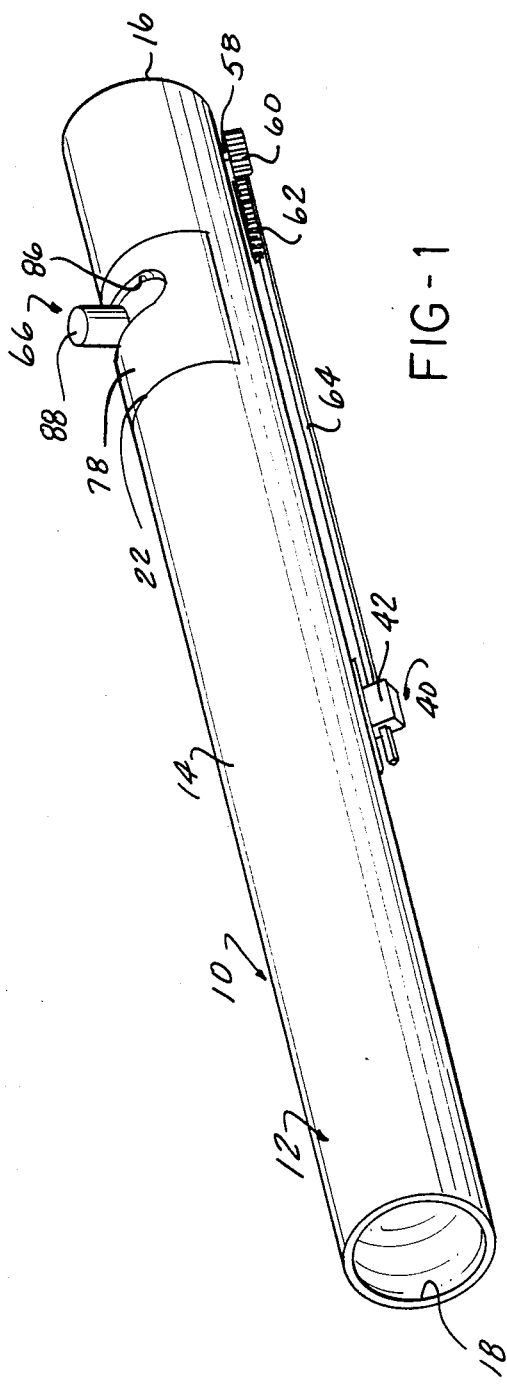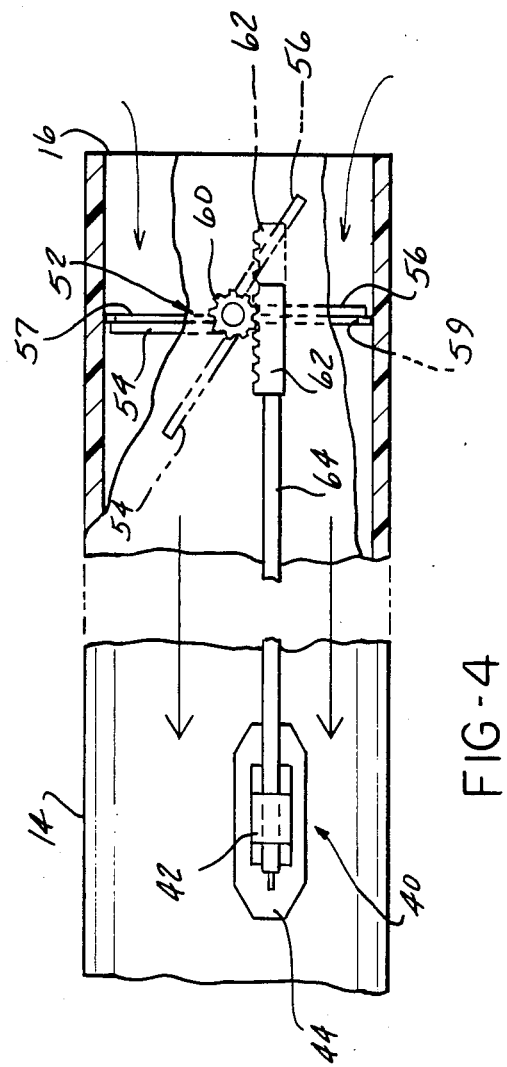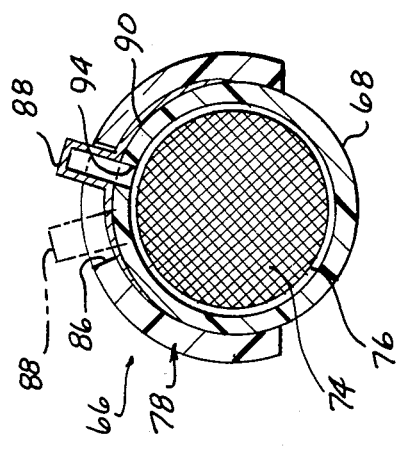

INSECT TRAP

BACKGROUND OF THE INVENTION

1. Field of the Invention

This invention relates, in general, to insect traps and, specifically, to hand-held insect traps and, even more specifically, to hand-held insect traps using an air stream to draw insects into the trap.

2. Description of the Prior Art

Various devices have been devised to catch and trap flying insects, such as flies, mosquitos, etc. These devices make use of an electrically powered motor and suction fan to draw insects into a trap mounted within the device. U.S. Pat. Nos. 3,214,861; 4,074,458; 4,485,583 and 4,607,451 are exemplary of insect traps of this type.

These devices typically make use of movable flaps which are drawn inward under air pressure generated by the suction fan to open one end of the trap. The flaps automatically return to their original position closing the trap when air flow ceases thereby retaining insects within the trap.

The insects trapped by certain of these devices are contained within disposable bags housed within the device which can be removed or are emptied from the trap by opening one end of the trap. U.S. Pat. No. 3,214,861 also discloses the use of an insecticide impregnated bag to kill insects drawn into the trap.

While such devices operate to trap flying insects, improvements are still desirable to enhance the effectiveness of such insect traps in trapping insects, such as flies mosquitos, etc., insure that the trapped insects are retained within the trap after air flow has ceased and, in simplifying the disposal of trapped insects. It would also be desirable to provide an improved insect trap which kills the insects trapped therein so as to further simplify disposal of the insects.

SUMMARY OF THE INVENTION

The present invention is an insect trap for trapping insects, such as flies, mosquitos, beetles, centipedes, etc. The trap includes a hollow housing having first and second ends. Means are mounted within the housing for generating an airstream through the housing to draw air into the first end of the housing and to exhaust air through the second end of the housing. Switch means are mounted on the housing for energizing the air stream generating means. A rigid closure member is pivotally mounted at the first end of the housing for movement between a first position closing the first end of the housing to air flow to a second position opening the first end and the interior of the housing to air flow. Finally, a hollow trap receptacle is removably insertable into the housing between the closure member and the air stream generating means.

In a preferred embodiment, the air stream generating means is formed of an electric power source, such as a battery, which is mounted within the housing. An electrical motor is connected to the battery via a switch which is movable between a first open or "off" position in which the battery is disconnected from the motor to a second closed or "on" position connecting the battery to the motor and energizing the motor. A fan formed of a plurality of vanes is mounted on the output shaft of the motor for drawing air through the first end of the housing and exhausting the drawn in air through the second end of the housing.

The closure member comprises a substantially planar, rigid member having a cross section substantially complimentary to the internal cross section of the first end of the housing. The closure member is pivotally mounted on the housing. Means are provided for pivotally moving the closure member between the first and second positions. In a preferred embodiment, coupling means are provided to couple the switch to the closure member pivoting means for simultaneous movement of the closure member between the first and second positions upon movement of the switch between the "off" and "on" positions. This insures that the closure member is in a first closed position when the switch is in the "off" position and moves to a second open position when the switch is moved to the "on" position.

The trap receptacle has a shape complimentary to the cross section of the housing and is removably insertable into and forms a continuous part of the housing between the closure member and the fan. A mesh or screen is mounted at one end of the removable trap for collecting insects drawn in through the first end of the housing by the air stream generated by the fan.

A hollow, open ended container is mounted on a slidable member carried by the removable trap receptacle. The open end of the container is alignable with an aperture formed in the side wall of the trap receptacle for dispensing an insecticide housed within the hollow container into the trap receptacle thereby killing any insects trapped by the screen to insure easy disposal of the insects.

The insect trap of the present invention provides efficient collection and trapping of insects, such as flies, mosquitos, beetles, centipedes, etc. The insect trap is lightweight and easy to use and, due to the use of an insecticide, provides easy disposal of any trapped insects.

BRIEF DESCRIPTION OF THE DRAWING

The various features, advantages and other uses of the present invention will become more apparent by referring to the following detailed description and drawing in which:

FIG. 1 is a perspective view of the insect trap of the present invention;

FIG. 3 is a cross sectional view generally taken along line 3—3 in FIG. 2; and

FIG. 4 is a partial side elevational view showing the interconnection of the switch and closure member of the insect trap shown in FIG. 1.

DESCRIPTION OF THE PREFERRED EMBODIMENTS

Figure 2:
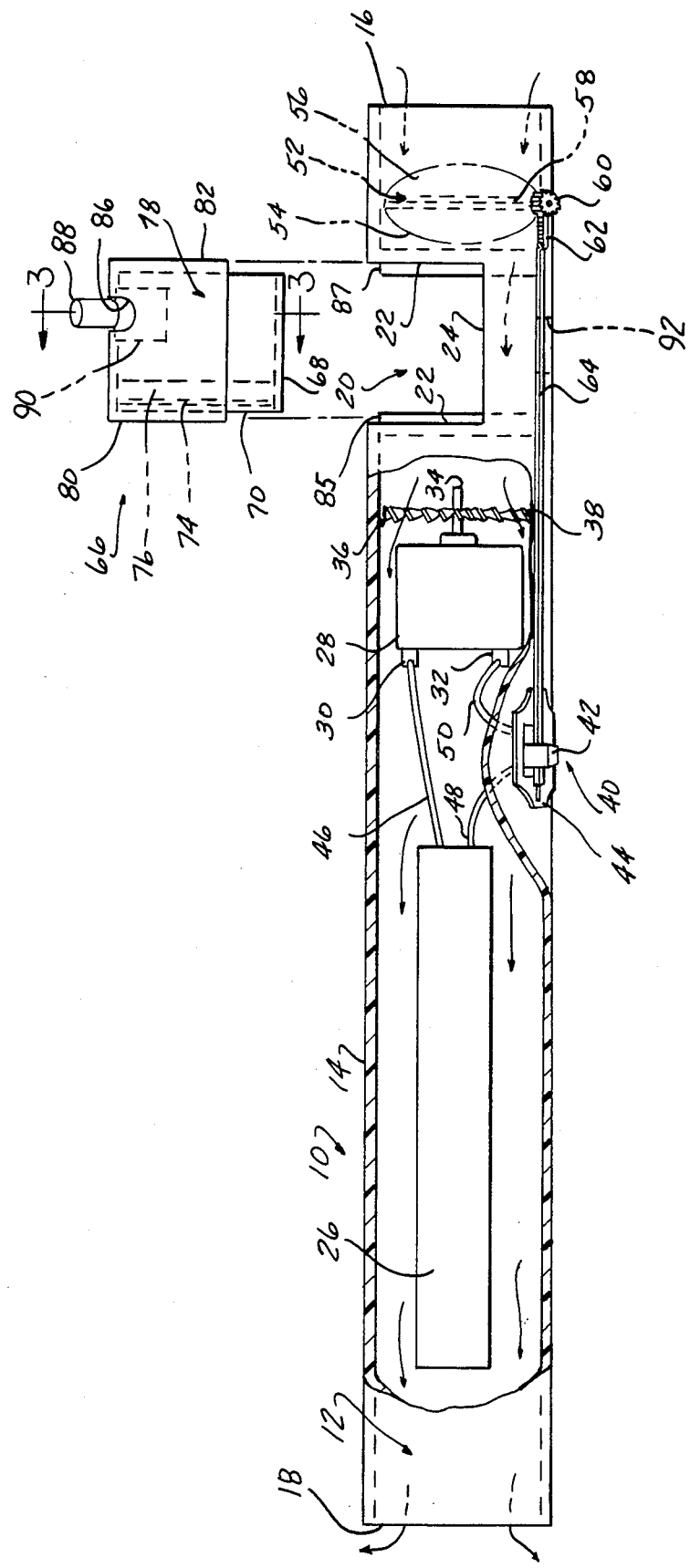
FIG. 2 is a partially broken, partially exploded, side elevational view of the insect trap shown in FIG. 1.

Throughout the following description and drawing, an identical reference number is used to refer to the same component shown in multiple figures of the drawing.

Referring to the drawing and to FIGS. 1 and 2 in particular, there is illustrated an insect trap 10 which is designed to trap insects, such as flies, mosquitos, beetles, centipedes, etc. and to house such trapped insects until their disposal. Optionally, the insect trap 10 includes a hollow chamber which selectively dispenses an insecticide into the interior of the insect trap for killing the trapped insects prior to their disposal.

As shown in FIGS. 1-4, the insect trap 10, in general, includes a housing 12, an electrical power source 26, an electric motor 28, a rotatable fan 36, a switch 40, a closure member 52 and a removable trap receptacle 66.

The housing 12, as shown in FIGS. 1 and 2, is hollow and includes first and second ends 16 and 18, respectively, and a side wall 14. Although the housing 12 is illustrated as having a substantially circular cross section, it will be understood that other configurations, such as square, etc., for the housing 12 may also be employed.

The housing 12 is formed of a lightweight material, such as plastic, for ease of use. A transverse extending slot 20 is formed adjacent the first end 16 of the housing 12 for reasons which will be described in greater detail hereafter. The slot 20 is defined by side walls 22 and bottom walls 24.

Means are mounted within the housing 12 for generating an airstream in the housing 12 drawing air into the first end 16 of the housing 12 and exhausting air from the second end 18. In a preferred embodiment, the air stream generating means comprises the electric power source 26 which may be for example, a battery. The battery may be a single battery or a plurality of conventional storage batteries. The battery 26 may also be of the rechargeable type, if desired. The electric motor 28 is connected, as described hereafter to and driven by electric power supplied by the battery 26. The motor 28 is provided with terminals 30 and 32 for connecting leads as described hereafter thereto. The motor 28 includes an output shaft 34 extending from one end. The fan 36 includes a plurality of angled, radially extending vanes or blades 38. The vanes 38 are fixed or keyed to the output shaft 34 of the motor 28 for rotation upon energization of the motor 28.

The fan 36 generates an airstream within the interior of the housing 12 drawing air from outside the housing 12 through the first end 16 and exhausting air from the interior of the housing 12 through the second end 18.

Switch means 40 are mounted on the housing 12 and include a manually movable operator 42 connected through a switch plate 44 mounted on the exterior of the housing 12 to a switch contact body, not shown. The switch contact is connected to one end of a lead 48 extending from the battery 26 and to one end of a lead 50 connected to terminal 32 on the motor 28. Another lead 46 extends from the battery 26 to the other terminal 30 of the motor 28.

The operator 42 is movable from a first or "off" position shown in FIG. 2 in which the motor 28 is disconnected from the electrical power source 26, to a second or "on" position forward of the "off" position in which the switch contact completes a circuit between the electrical power source 26 and the motor 28 supplying electrical power to and energizing the motor 28 and rotating the fan 36. Simply put, movement of the operator 42 to the "on" position energizes the motor 28 and generates an air stream through the housing 12; while movement of the operator 42 to the "off" position de-energizes the motor 28 and halts the flow of air through the housing 12.

As shown in FIGS. 2 and 4, a substantially planar closure member 52 is mounted adjacent the first end 16 of the housing 12. The closure member 52 may be formed in any suitable manner, such as a single piece or the two piece overlapping assembly shown in FIG. 2.

As shown in FIG. 2, the closure member 52 includes an upper, substantially semi-circular closure plate 54 which is attached at its lower end to a pivot pin 58 extending crosswise through the housing 12. A lower closure plate 56 is attached to the other side of the pin 58. The lower closure plate 56 also has a semi-circular shape. The upper and lower closure plates 54 and 56 combine to form an overall configuration for the closure member 52 which is substantially complimentary to the inside configuration or cross section of the housing 12. A ring 57 having a through aperture 59 is mounted interiorally within the housing 12 adjacent the closure member 52. The edges of the ring 57 cooperate with the peripherial edges of the closure plates 54 and 56 to form a solid surface across the housing 12 to thereby completely close off the end 16 of the housing 12 when the closure member 52 is in the first position shown by the solid lines in FIG. 4. The ring 59 also acts as a stop to limit rotation of the closure member 52 to the vertical position shown in FIG. 4.

One end of the pivot pin 58 extends outward through one side of the housing 12 as shown in FIG. 1. A pivoting means in the form of a circular gear 60 is mounted on the exterior end of the pin 58 for rotating the closure member 52 between the first and second positions. Other pivoting means, such as a manually operated lever directly connected to the pin 58, may also be employed.

In a preferred embodiment of the insect trap 10 of the present invention, means are provided for coupling the switch 40 to the closure member 52 for simultaneous movement of the closure member 52 with movement of the switch 40. The coupling means comprises an elongated rod 64 connected at one end to the switch operator 42. The other end of the rod 64 terminates in a rack gear 62 which is meshingly engaged with the gear 60 mounted on one end of the pin 58. In this manner, movement of the switch operator 42 between the "off" and "on" positions is translated into simultaneous pivoting movement of the closure member 52 between the first and second positions. This insures that the closure member 52 is in the first position closing off the first end 16 of the housing 12 when the switch is in the "off" position and the motor 28 de-energized so as to retain the insects within the removable trap receptacle 66 and is in the second position opening the first end 16 of the housing 12 to air flow when the motor 28 is energized and the fan 36 rotating.

As shown in FIGS. 2 and 3, the removable trap receptacle 66 includes a substantially circular cylindrical tubular member 68 having a cross section slightly smaller than the cross section of the housing 12 so as to fit therein through the slot 20 formed adjacent the first end 16 of the housing 12. The cylindrical tubular member 68 is hollow and is provided with first and second open ends 70 and 72 which form a continuation of the hollow interior of the housing 12 when the removable trap receptacle 66 is inserted into the slot 20 in the housing 12.

A porous trap 74, such as a mesh or screen, is mounted within a circular holder 76 and fixed adjacent the second end 70 of the cylindrical tubular member 68. The mesh 74 spans the entire cross section of the tubular member 68 to trap insects drawn into the housing 12 by the airstream generated by the fan 36.

An arcuate sleeve 78 is mounted over an upper portion of the cylindrical tubular member 68 and secured thereto at its outer edges. The sleeve 78 has a slightly longer length than the cylindrical tubular member 68 such that its outer ends 80 and 82 extend outward beyond the end 70 and 72 of the tubular member 68, respectively. The ends 80 and 82 of the sleeve 78 are removably insertable over circular-shaped, hollow disk members 85 and 87 mounted interiorly within the housing 12 and extending partially into the slot 20 from the side walls 22 of the slot 20. The disk members 85 and 87 provide shoulders for supporting the removable trap receptacle 66 in the housing 12 and cover the joint between the ends 80 and 82 of the sleeve 78 and the side walls 22 of the slot 20.

As described above, when the removable trap receptacle 66 is inserted into the housing 12, it forms a continuation of the interior of the housing 12 such that insects drawn into the housing 12 by the airstream generated by the fan 36 will be trapped by the mesh 74 within the trap receptacle 66. When the motor is de-energized, the closure member 52 moves to the closed position shown by the hidden lines in FIG. 4 to retain the insects within the trap receptacle 66 due to the engagement of the closure member 52 with the ring 57 mounted to the wall 14 of the housing 12. Yet, the trap receptacle 66 may be removed from the housing 12 for convenient disposal of insects trapped therein.

In a preferred embodiment, the removable trap receptacle 66 is provided with a dispensing means for dispensing an insecticide to kill the insects trapped therein. The dispensing means includes a hollow, open-ended container or chamber 88 mounted on an arcuate sliding guide plate 90. The guide plate 90 is disposed between the opposed surfaces of the cylindrical tubular member 68 and the sleeve 78. The chamber 88 extends through a slot 86 formed in the sleeve 78.

A suitable insecticide material which gives off vapors to kill insects within the trap receptacle 66 is disposed within the chamber 88. The insecticide may be in solid form or as a liquid contained in a porous material or wick mounted in the chamber 88.

An aperture 94 is formed in the side wall of the cylindrical tubular member 68, as shown in FIG. 3. The chamber 88 is movable in the slot 86 between a first position in which the open end of the chamber 88 is alignable with the aperture 94 in the tubular member 68 thereby exposing the insecticide disposed within the hollow chamber 68 to the interior of the trap receptacle 66. The chamber 88 is movable within the slot 86 along with the guide plate 90 to a second position shown in phantom in FIG. 3 in which the open end of the chamber 88 is spaced from the aperture 94 in the tubular member 68 thereby closing off the open end of the chamber 88.

Optionally, an aperture 92 is formed in the housing 12 between the bottom walls 24 of the slot 20, as shown in FIG. 3. The aperture 92 enables finger pressure to be applied therethrough to the tubular member 68 to aid in removing the trap receptacle 66 from the housing 12.

Also, in place of the insecticide, a sheet having a sticky surface, such as "fly paper", may be removably inserted into the interior of the tubular member 68 to catch the insects and provide easy disposal thereof.

In operation, the trap receptacle 66 is inserted into the housing 12. Upon movement of the switch operator 42 to the "on" position, electric power is delivered to the motor 28 causing rotation of the fan 36 and the generation of an airstream drawing in air through the first end 16 of the housing 12. Simultaneous with movement of the switch operator 42, the closure member 52 pivots to the second position shown in phantom in FIG. 4 opening the first end 16 of the housing 12 to air flow. Insects entrained in the airstream drawn into the first end 16 of the housing 12 will strike the mesh or screen 74 and be trapped thereon.

Movement of the switch operator 42 to the "off" position disconnects electric power from the motor 28 and halts the rotation of the fan 36. Simultaneously, the closure member 52 pivots to its first position shown by the hidden lines in FIG. 4 closing the open end 16 of the housing 12 and retaining the insects trapped in the trap receptacle 66 within the interior of the trap receptacle 66. The trap receptacle 66 may then be removed from the housing 12 to dispose of the insects trapped therein.

Optionally, while in operation or any time, the insecticide containing chamber 88 may be mementarily moved to the first position shown by the solid lines in FIG. 3 in which the open end of the container 88 is alinged with the aperture 94 in the cylindrical tubular member 68 causing a permeation of the insecticide into the interior of the trap receptacle 66 then returned to the position shown in phantom. The insecticide kills the insects trapped in the trap receptacle 66 to provide ease in disposing of the insects without an opportunity for the insects to fly out of the trap receptacle 66 after it has been removed from the housing 12.

In summary, there has been disclosed an improved insect trap which efficiently traps insects, such as flies, mosquitos, beetles, centipedes, etc., in a simple and easy manner. The insect trap also provides convenient disposal of the trapped insects due to the use of an insecticide housed within the trap receptacle.

What is claimed is:

1. An insect trap comprising:
   a hollow housing having first and second open ends;
   means, mounted within the housing, for generating an airstream through the housing drawing air into the first end and exhausting air from the second end of the housing;
   switch means mounted on the housing for energizing the air stream generating means;
   a closure member pivotally mounted adjacent the first end of the housing for movement between a first position closing off the first end of the housing to air flow to a second position opening the first end of the housing to air flow therepast; and
   a hollow trap receptacle removably insertable into the housing between the closure member and the airstream generating means; the trap receptacle including a screen for trapping insects drawn into the trap receptacle.

2. The insect trap of claim 1 further including:
   a slot formed transversely in the housing adjacent the closure member;
   the trap receptacle comprising:
     a tubular member having first and second open ends;
     the screen being mounted adjacent one of the first and second ends of the tubular member, the tubular member forming a co-axial extension of the housing when inserted into the slot in the housing.

3. The insect trap of claim 2 further including:
   an aperture formed in the outer wall of the tubular member;
   a slidable closure mounted over the tubular member;
   an open-ended, hollow chamber mounted on the slidable closure and movable from a first position spaced from the aperture in the tubular member to a second position in which the interior of the chamber is in communication with the aperture; and
an insecticide disposed within the hollow chamber.

4. The insect trap of claim 1 further including:
means for pivoting the closure member between the first and second positions; and
means for coupling the closure member pivoting means with the switch means for simultaneously causing movement of the closure member between the first and second positions upon movement of the switch means between the first and second positions.

5. The insect trap of claim 4 wherein the coupling means comprises:
an elongated rod connected between the closure pivoting means and the switch means for mechanically coupling the closure pivoting means together.

6. The insect trap of claim 5 wherein the closure pivoting means comprises:
a pin joined to the closure member and rotatably extending through the housing transverse to the direction of air flow through the housing;
a gear mounted on the pin; and
rack means mounted on the end of the rod and meshingly engaging the gear to rotate the gear, pin and closure member simultaneous with linear movement of the switch means.

7. The insect trap of claim 1 wherein the airstream generating means comprises:
an electric power source mounted within the housing;
an electric motor mounted within the housing; and
a fan mounted within the housing and connected to and rotated by the motor for generating the airstream;
the switch means electrically connected between the electric power source and the motor for selectively energizing and de-energizing the motor as the switch is moved between the "on" and "off" positions.

8. The insect trap of claim 7 wherein the electrical power source comprises a storage battery.

9. An insect trap comprising:
a hollow housing having first and second open ends;
an electrical power source mounted within the housing;
an electric motor mounted within the housing;
a fan mounted within the housing and connected to and rotated by the motor for generating an airstream drawing air into the first end of the housing and exhausting air out of the second end of the housing;
an electrical switch mounted on the housing and connected in an electrical circuit with the electrical power source and the motor, the switch being manually movable from an "off" position disconnecting the electrical power source from the motor to an "on" position connecting the electrical power source to the motor for energizing the motor and rotating the fan;
a closure member pivotally mounted in the housing adjacent the first end of the housing and movable between a first position closing off the first end of the housing to air flow to a second position opening the interior of the housing to air flow therethrough;
a gear mounted externally of the housing and fixedly connected to the closure member;
an elongated rod having a rack gear formed at one end, the rod fixedly connected to the switch at another end, the rack gear meshingly engaging the gear to couple movement of the switch to movement of the closure member; and
a hollow removable trap receptacle removably insertable into the housing and forming a continuation of the housing, the removable trap receptacle being insertable into the housing between the closure member and the fan;
a screen mounted within the trap receptacle for trapping insects drawn into the first end of the housing.

10. The insect trap of claim 9 further including a hollow, open ended container slidably mounted on the trap receptacle;
an aperture formed in the trap receptacle alignable when the hollow container is disposed at a first position with the interior of the container to expose the contents of the hollow container to the interior of the trap receptacle; and
an insecticide disposed within the interior of the hollow container for dispersal into the interior of the trap receptacle when the hollow container is disposed in the first position aligned with the aperture in the trap receptacle.

* * * * *